United States Patent
Baek et al.

(10) Patent No.: US 8,897,775 B2
(45) Date of Patent: Nov. 25, 2014

(54) METHOD AND SYSTEM FOR SEARCHING FEMTOCELL ACCESS POINTS

(75) Inventors: Seung-Kwon Baek, Daejeon (KR); Jae Su Song, Daejeon (KR); Jin Up Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 317 days.

(21) Appl. No.: 13/331,040

(22) Filed: Dec. 20, 2011

(65) Prior Publication Data

US 2012/0157096 A1  Jun. 21, 2012

(30) Foreign Application Priority Data

Dec. 21, 2010  (KR) .................. 10-2010-0131799

(51) Int. Cl.
| | | |
|---|---|---|
| H04Q 7/00 | (2006.01) | |
| H04W 48/20 | (2009.01) | |
| H04B 17/00 | (2006.01) | |
| H04W 24/02 | (2009.01) | |
| H04W 28/04 | (2009.01) | |
| H04W 24/10 | (2009.01) | |
| H04W 84/04 | (2009.01) | |
| H04W 48/08 | (2009.01) | |
| H04W 8/00 | (2009.01) | |

(52) U.S. Cl.
CPC .............. *H04W 48/20* (2013.01); *H04W 24/02* (2013.01); *H04W 28/048* (2013.01); *H04B 17/0057* (2013.01); *H04W 24/10* (2013.01); *H04W 84/045* (2013.01); *H04W 48/08* (2013.01); *H04W 8/005* (2013.01)
USPC ............ 455/434; 455/414.1; 455/456.1; 455/456.2

(58) Field of Classification Search
CPC ................... H04W 36/0061; H04W 36/0083; H04W 84/045; H04W 48/18
USPC .......................... 455/434, 414.1, 456.1, 456.2
See application file for complete search history.

(56) References Cited

U.S. PATENT DOCUMENTS

| | | | |
|---|---|---|---|
| 2009/0098885 A1 | 4/2009 | Gogic et al. | |
| 2009/0111525 A1 | 4/2009 | Hwang et al. | |
| 2009/0247157 A1 | 10/2009 | Yoon et al. | |
| 2010/0113032 A1* | 5/2010 | Lee et al. | 455/437 |
| 2011/0045835 A1* | 2/2011 | Chou et al. | 455/446 |

FOREIGN PATENT DOCUMENTS

| | | |
|---|---|---|
| KR | 10-2009-0037636 | 4/2009 |
| KR | 10-2009-0044352 | 5/2009 |

* cited by examiner

*Primary Examiner* — Ajit Patel
*Assistant Examiner* — Julio Perez
(74) *Attorney, Agent, or Firm* — Staas & Halsey LLP (57) ABSTRACT

A method of searching a femtocell access point includes: transmitting configuration/measurement information an operating frequency and a transmission power strength from multiple femtocell access points located within the macro cell to an OSM)/CPC server; and receiving, at the OSM/CPC server, the configuration/measurement information from the femtocell access points, and generating a femtocell access point list usable in a mobile terminal to provide the generated femtocell access point list to the mobile terminal. The method further includes selecting, at the mobile terminal, one femtocell access point from the femtocell access point list provided from the OSM/CPC server and accessing the selected femtocell access point.

9 Claims, 10 Drawing Sheets

| FAP ID($C_f$) | OPERATION PARAMETERS | | MEASUREMENT PARAMETERS | | |
|---|---|---|---|---|---|
| | Frequency ($F_f$) | TX Power ($P_f$) | Macro Cell ID ($C_m$) | Power of Pilot CH($P_m$) | Power Margin ($\Delta_m$) |
| 101 | 2500,2575 | 22 | 1 | 35 | 7 |

METHOD AND SYSTEM FOR SEARCHING FEMTOCELL ACCESS POINTS

CROSS-REFERENCE(S) TO RELATED APPLICATION(S)

The present invention claims priority of Korean Patent Application No. 10-2010-0131799, filed on Dec. 21, 2010, which is incorporated herein by reference.

FIELD OF THE INVENTION

The present invention relates to a method of searching femtocell access points, and more particularly, to a method and system for searching a femtocell access point, which are capable of reducing a femtocell search time taken in a mobile terminal by providing accessible femtocell configuration information to mobile terminals that access a base station of a macro cell in a mobile communication environment in which multiple femtocells are arranged to provide a service, and more efficiently searching a femtocell by minimizing interference between the macro cell and the femtocell.

BACKGROUND OF THE INVENTION

Recently, with the development of information communications and the increasing demands for multimedia services, a base station technique that provides a service in a combined form of an existing network at home or indoors is required. To this end, a femtocell concept has been introduced in order to provide a data service at a high speed while solving defects occurring when providing a service at an indoor radio wave shadow area. The standardization and technical development thereof are in progress. The standardization of a femtocell started from 3GPP and 3GPP2 in 2007. Several issues such as a femtocell network structure, an interface scheme, a handover procedure, selection of an access system, mobility management and synchronization and the like have been discussed.

The foregoing femtocell satisfies requirements in a user service and has an effect of saving installation and maintenance time and operating costs of a base station, by allowing an installation and a change of a cell providing a service to be within a space like home or an office. Further, such a femtocell can increase a frequency usage rate by minimizing a cell size, and provide an existing wired wideband service at low costs even in a mobile communications network. In addition, when a femtocell is introduced to an indoor environment to provide a service, since a conventional mobile terminal that accesses a wideband wireless access service in the indoor environment by employing a cellular and WLAN dual mode function can provide a service by using only a cellular mode, it has a merit in that the cost thereof is lowered.

Further, the femtocell has a very small cell region in comparison to the macro cell, and thus, multiple femtocells may be installed in a single macro cell region. Also, the femtocell may be installed by mobile communication carriers in a service shadow area and an area with a high population density such as a shopping mall such that the service can be provided to registered subscribers, or installed directly by a subscriber in a limited space such as a home such that the subscriber can receive the service.

In this femtocell, since a service region is very small and an installation thereof is easy, multiple femtocells may be provided in a single macro cell. Thus, managing the femtocell by a cell planning like an existing macro cell is very difficult. Also, the femtocell may provide a service by using the same frequency as that of a macro cell and a neighbor femtocell. Therefore, since there is interference between cells, a frequency configuration scheme of a femto access point (FAP) that takes into consideration interference is required.

That is, in an environment where macro cells and femtocells are mixed, when a mobile terminal is connected to a macro cell and a channel environment is good, the mobile terminal does not search and access a femtocell although the femtocell is present in an adjacent position. In this case, communication between the mobile terminal and the macro cell acts as serious interference to the femtocell.

Further, a mobile terminal requires functions of estimating and searching a position of a femtocell and determining whether or not to access thereto, in order to receive a service provided by the femtocell. In case where a mobile terminal can support a global positioning system (GPS) function and receive a GPS signal, position information measured by the mobile terminal and position information on an FAP may be compared to search the femtocell. However, in case where a mobile terminal with no GPS function or a mobile terminal with a GPS function enters indoor to which a GPS signal cannot be received, it fails to obtain position information on the mobile terminal.

In this case, the mobile terminal does not recognize the femtocell and accesses a macro cell to receive a service or periodically performs a scanning procedure for searching a femtocell. Thus, battery consumption of the mobile terminal is great and a search time increases.

SUMMARY OF THE INVENTION

In view of the above, the present invention provides a method and a system for searching a femtocell access point, which are capable of reducing a femtocell search time taken in a mobile terminal by providing accessible femtocell configuration information to mobile terminals that access a base station of a macro cell, in a mobile communication environment in which multiple femtocells are arranged to provide a service, and more efficiently searching a femtocell by minimizing interference between the macro cell and the femtocell.

In accordance with an aspect of the present invention, there is provided a method of searching a femtocell access point including: transmitting configuration/measurement information including an operating frequency and a transmission power strength determined by measuring a pilot channel signal strength of a base station within a macro cell, from multiple femtocell access points located within the macro cell to an operator spectrum manager (OSM)/cognitive pilot channel (CPC) server; receiving, at the OSM/CPC server, the configuration/measurement information from the femtocell access points, and generating a femtocell access point list usable in a mobile terminal to provide the generated femtocell access point list to the mobile terminal; and selecting, at the mobile terminal, one femtocell access point from the femtocell access point list provided from the OSM/CPC server and accessing the selected femtocell access point.

In accordance with another aspect of the present invention, there is provided a system of searching a femtocell access point including: a femtocell access point for determining configuration/measurement information including an operating frequency and a transmission power strength by using a pilot channel signal strength measured from a base station within a macro cell; an operator spectrum manager (OSM)/cognitive pilot channel (CPC) server for receiving the configuration/measurement information from the femtocell access point, and generating a femtocell access point list usable in a mobile terminal to provide it to the mobile terminal; and the mobile terminal for receiving the femtocell access point list transmitted from the OSM/CPC server and the configuration/measurement information on each femtocell access point included in the femtocell access point list with a pilot channel signal strength of the base station within the macro cell to access a femtocell access point having a smallest interference.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Hereinafter, the operational principle of the present invention will be described in detail with reference to the accompanying drawings. In the following description, well-known functions or constitutions will not be described in detail if they would obscure the invention in unnecessary detail. Further, the terminologies to be described below are defined in consideration of functions in the present invention and may vary depending on a user's or operator's intention or practice. Thus, the definitions should be understood based on all the contents of the specification.

Figure 1:
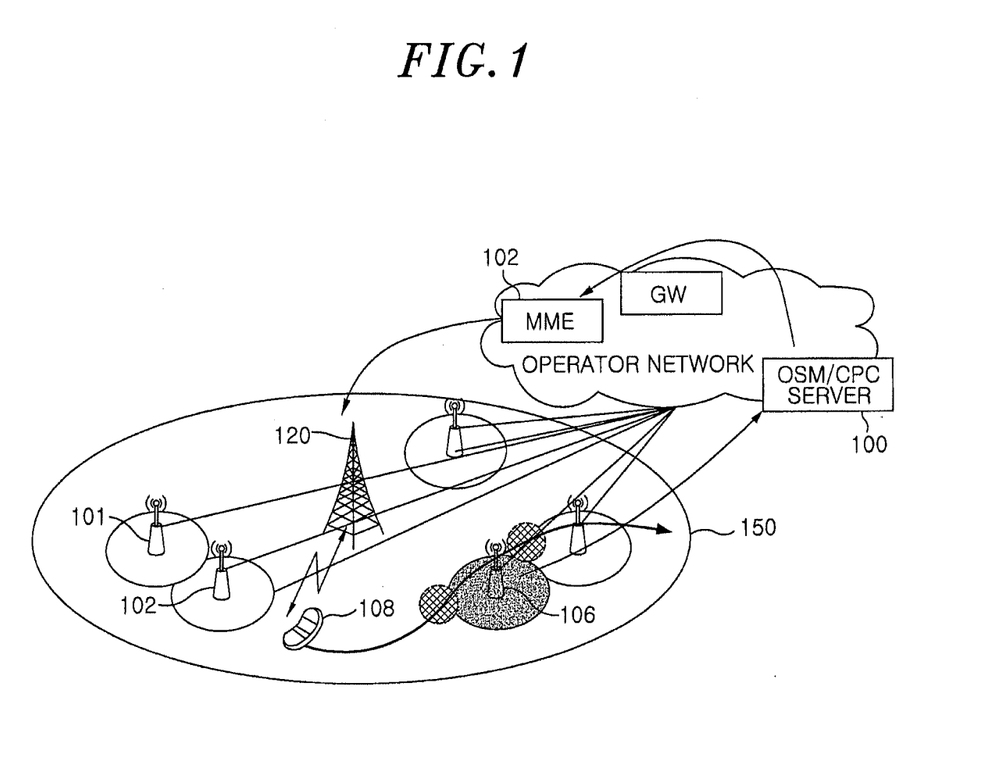
FIG. 1 is a view illustrating a network architecture of an FAP search system in accordance with an embodiment of the present invention.

FIG. 1 shows an arrangement of a femtocell and an interworking structure between the femtocell and an operator network in accordance with an embodiment of the present invention. Hereinafter, an FAP configuration method and an FAP search procedure using FAP configuration information will be described with reference to FIG. 1.

Referring to FIG. 1, multiple femtocells may be provided in a region of a single macro cell 150, in which each of the femtocells is connected to an operator network using a public network. A mobile terminal 108 may perform an access process by searching a femtocell access point or a base station of a macro cell to receive a service therefrom.

A femto access point (FAP) 106 includes a function of the mobile terminal 108 using a software defined radio (SDR) function in addition to a function of the FAP, dynamically performs the mobile terminal function and the FAP function by using an SDR technology, and measures usage frequencies of a macro base station 120 and a neighbor FAP and a signal level of a pilot channel thereof.

The FAP 106 measures a usage frequency of the macro base station 120 and that of the neighbor FAP, and a reception signal level of a pilot channel, and configures an operating frequency and a transmission power level based on the measured information. Further, the FAP 106 transfers the measurement information such as the configuration information (frequency allocation information and transmission power level) configured in this manner, the base station information (macro cell ID and pilot channel signal level) measured by the FAP, or the like to an operator spectrum manager (OSM)/cognitive pilot channel (CPC) server 100 located in a core network through a wired network.

The OSM/CPC server 100 manages the frequency allocation information on the macro base station 120 and FAP 106 installed in the operator network, and manages the frequency allocation information transferred from the OSM and deployment information of the macro base station 120 and FAP 106. Herein, as a function of the OSM/CPC server 100, an access network discovery selection function (ANDSF) suggested by 3GPP may be used.

The OSM/CPC server 100 receives and stores the FAP configuration/measurement information, performs a power level margin estimation process based on the received FAP measurement information, and broadcasts an FAP list that can be serviced. That is, the OSM/CPC server 100 broadcasts a list of FAPs involved in the specific macro cell 150 by cooperatively operating with a mobility management entity (MME) 102.

The MME 102 generates a valid list of FAPs currently accessible, from the FAP list received from the OSM/CPC server 100, in consideration of the FAP capacity and users accessing the macro cell 150 and transfers the same to the macro base station 120.

The macro base station 120 broadcasts the received valid FAP list to the mobile terminal 108 within the corresponding macro cell 150 through system information.

The mobile terminal 108 searches an FAP and accesses thereto by using the received FAP list, stores the valid FAP list received through the system information. The mobile terminal 108 searches an appropriate FAP from the valid FAP list based on a signal level of a pilot channel of the macro cell 150. When the searched FAP is a serviceable FAP, an access procedure is performed.

Figure 2:
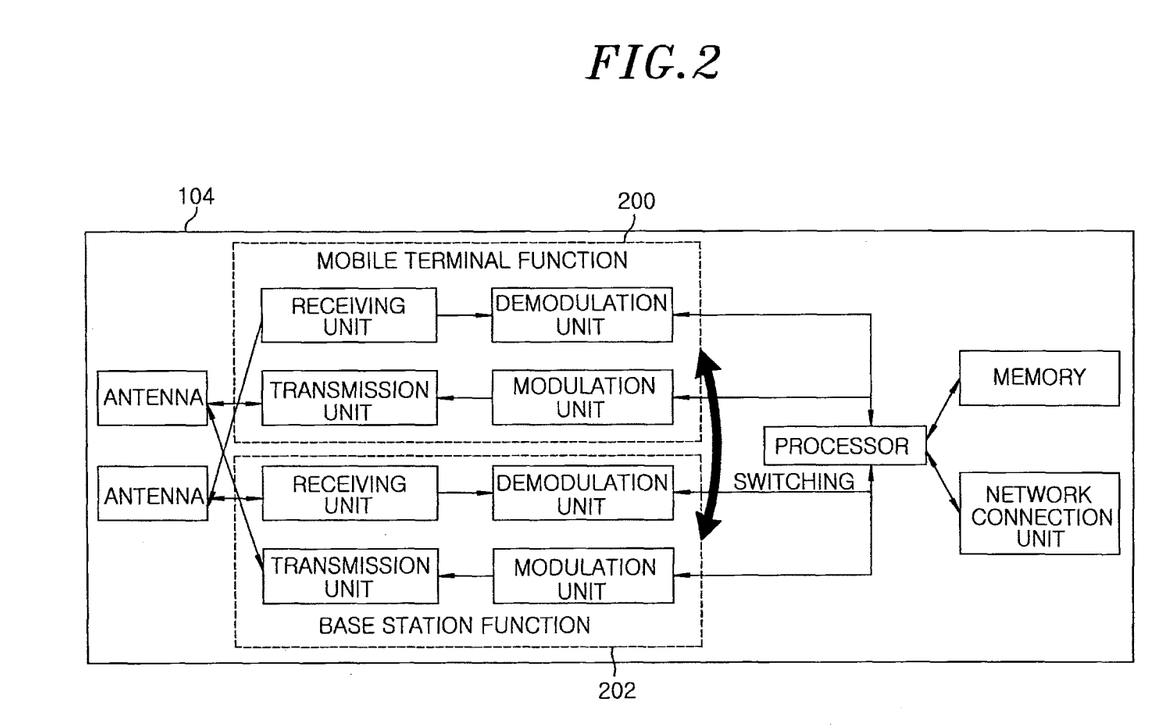
FIG. 2 is a block diagram illustrating a functional configuration of an FAP in accordance with the embodiment of the present invention.

FIG. 2 is a block diagram illustrating a functional configuration of the FAP 106 in accordance with the embodiment of the present invention.

Referring to FIG. 2, the FAP 106 selectively performs a mobile terminal function 200 of the macro cell 150 and a femto AP function 202 by using an SDR technology.

That is, the FAP 106 operates the function of a mobile terminal in order to configure initial operation parameters and measures a usage frequency of a neighbor cell or the like, and operates the function of a femto AP in order to provide a femtocell service to a mobile terminal. In addition, software modules for operation in each function mode are stored in a memory, and loaded and used by a processor as necessary.

Figure 3:
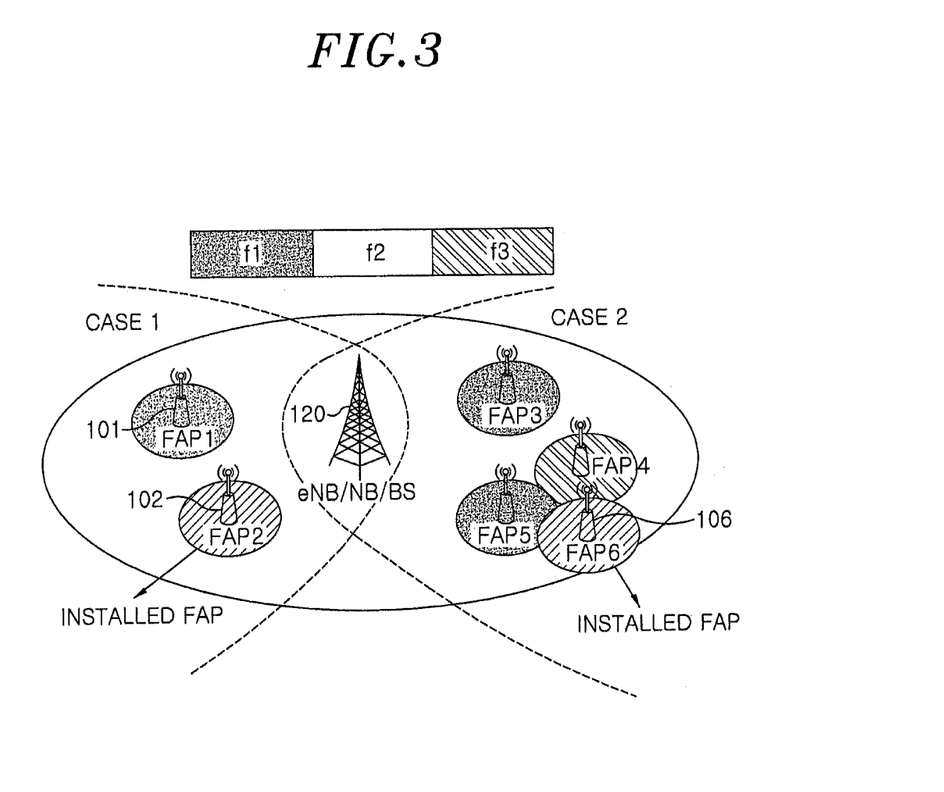
FIG. 3 is a view illustrating an example of configurating an operating frequency of the FAP in accordance with the embodiment of the present invention.

FIG. 3 is a view illustrating an operating frequency configuration scheme in an FAP in accordance with the embodiment of the present invention.

The FAP measures a usage frequency of a neighbor cell and a signal level of a pilot channel of the neighbor cell by using the function of the mobile terminal 108. The operating frequency is configured by using the following rules based on the measured information.

First, when there are any available frequencies among frequencies usable in a system, the operating frequency is selected and configured from the unused frequencies.

Thereafter, when there is no available frequency among frequencies usable in the system, a frequency having a lowest signal level in a pilot channel of the neighbor cell that has been measured is selected and configured as the operating frequency.

Referring to FIG. 3, Case 1 refers to a case in which FAP 102 is to be newly configured, and shows an example in which, since the current macro base station 120 uses a frequency f2 and FAP 101 uses a frequency f1, the operating frequency of the FAP 102 is configured as a frequency f3.

Next, Case 2 refers to a case in which FAP 106 is to be newly configured, and shows an example in which, since all of frequencies f1, f2 and f3 are used as a result of measuring signal levels of pilot channels of neighbor cells, f2 having a lowest signal level of the pilot channel is configurated as the operating frequency.

The configuration information and measurement information of the FAP as described above are transferred to the OSM/CPC server 100 located in the operator network through a wired network.

Then, the OSM/CPC server 100 derives a cell radius where an FAP can provide a service, i.e., a serviceable region of the FAP, by using a transmission power level of the FAP based on received information. Then, the OSM/CPC server 100 determines a transmission signal level range of the macro base station 120 in a serviceable region of the FAP (i.e., performing the power level margin estimation process). For example, a cell radius of the FAP and a transmission signal level range of the macro base station 120 may be derived using Eq. 1 as follows:

$$PWR_d = P_t - L - 10n \log(d) + f(\mu, \sigma) \qquad \text{Eq. 1}$$

wherein $P_t$ is a transmitted power, L is a constant power loss, n is path loss exponent, d is a distance between UE and BS/AP, and $f(\mu, \sigma)$ is a shadow fading which as Gaussian with mean $\mu=0$.

The OSM/CPC server 100 performs the foregoing procedure, and then generates and stores an FAP list for the macro cell 150 by using the received FAP configuration information and measurement information and the derived transmission signal level range of the macro base station 120 for the FAP. The stored FAP list is periodically transferred to the mobile terminal 108 through the MME 102 and the macro base station 120.

Meanwhile, the foregoing FAP may be classified into FAPs to which any cellular network subscribers can access and FAPs to which only specific subscribers can access (i.e., closed subscriber group (CSG) FAPs). Also, in most cases, the FAP has a fixed service capacity (e.g., 2 lines of voice session and 1 Mbps of data session), and therefore, although the FAP is installed, when the capacity of a provided service exceeds the fixed service capacity, the service may not be available.

Thus, the MME 102 generates a valid FAP list based on the FAP list received from the OSM/CPC server 100 in consideration of such functional requirements. To this end, FAPs from which a service is not available are removed based on a registration state of each FAP from the received FAP list, and in case of a CSG FAP, when a CSG subscriber does not access the macro cell 150 to which the FAP belongs, the corresponding FAP is removed and a valid FAP list is then generated.

In order to perform the foregoing procedure, the MME 102 performs an information exchange process by cooperatively operating with a home subscriber server (HSS) located in the operator network.

The valid FAP list generated by the MME 102 is transferred to the macro base station 120 and relevant information is broadcasted to the mobile terminal 108 connected to the macro cell 150 through a message such as the system information.

Figure 4:
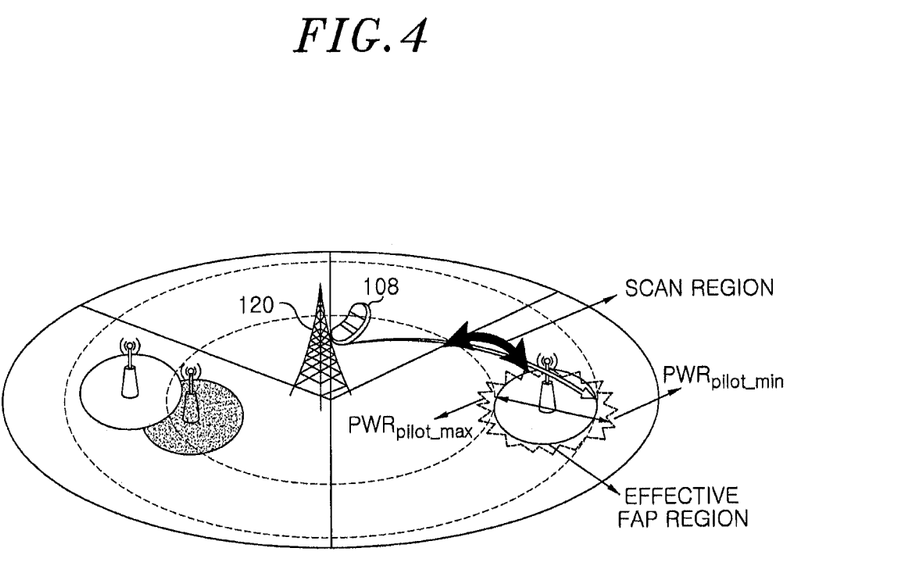
FIG. 4 illustrates a conceptual view of searching an FAP by a mobile terminal in accordance with the embodiment of the present invention.

FIG. 4 is a view illustrating an FAP search method of the mobile terminal 108 in accordance with the embodiment of the present invention.

Referring to FIG. 4, the mobile terminal 108 determines whether or not to search the FAP 106 by using the received valid FAP list and the pilot channel signal level of the macro cell 150. That is, the mobile terminal 108 continuously observes the pilot channel signal level of the macro cell 150, and searches the FAP 106 within a transmission signal level range of the macro base station 120 for the FAP 106 estimated by the OSM/CPC server 100 of the core network. PWRpilot_max and PWRpilot_min refer to a power level margin Δm derived from the OSM/CPC server 100, and a scan region refers to a section in which the FAP 106 is to be searched when the mobile terminal 108 moves. When the search is performed in this manner, even in case where position information cannot be provided by a GPS or the like, a position of the FAP 106 can be predicted.

Figure 5:
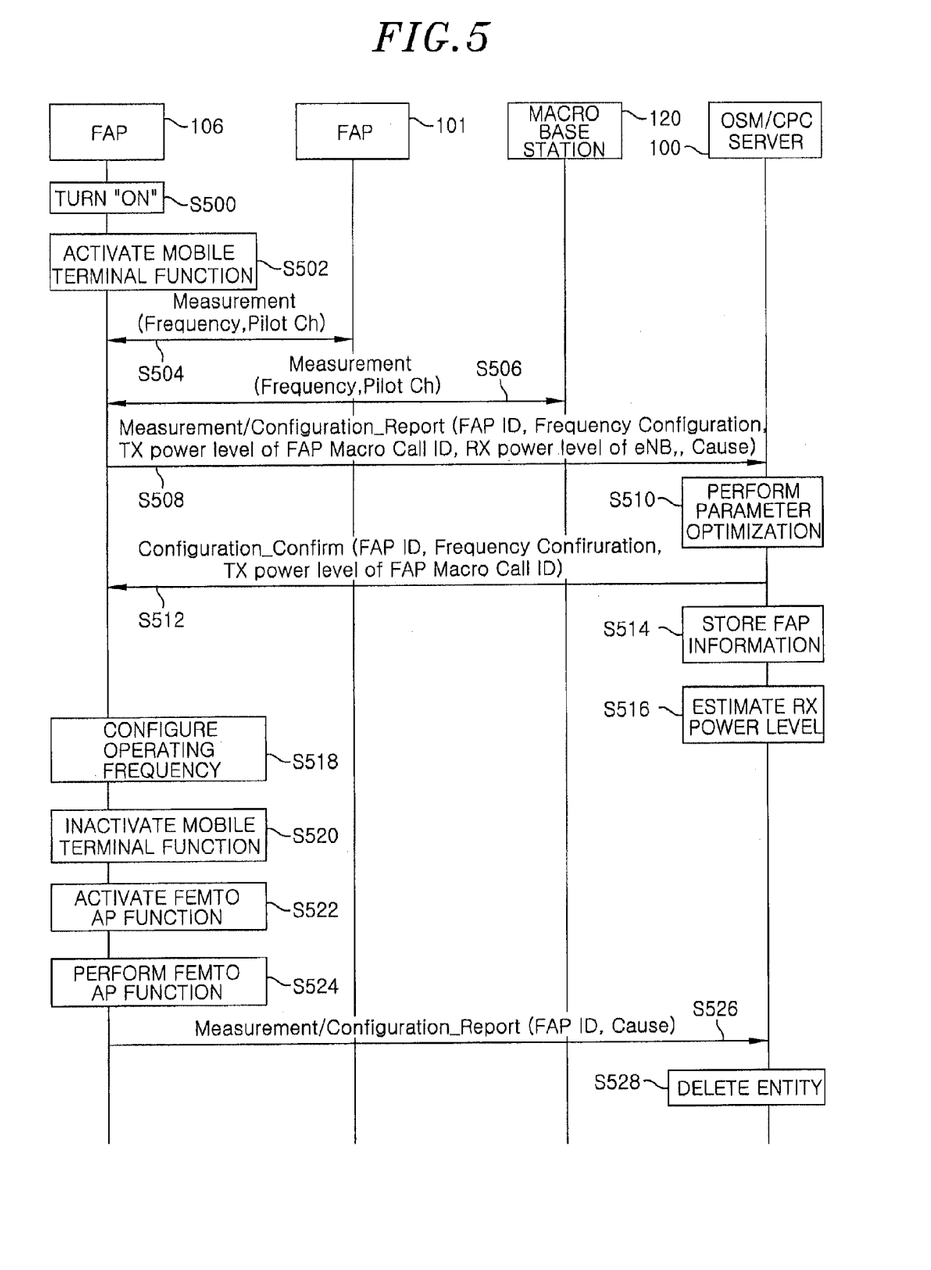
FIG. 5 is a flowchart illustrating a procedure in which an FAP performs measurements and configures operating parameters in accordance with the embodiment of the present invention.

FIG. 5 illustrates a procedure in which an FAP performs measurements and configures operating parameters in accordance with the embodiment of the present invention.

Referring to FIG. 5, the FAP 106 is turned on at an initial stage in step S500, the function of the mobile terminal is activated by using an SDR technique whenever necessary in step S502, and then frequencies and pilot channel signal levels of the neighbor macro cell 150 and the femtocell are measured in steps S504 and S506.

Thereafter, an operating frequency is derived by using the frequency configuration scheme as described above, and the configuration information and measurement information measured with respect to the neighbor macro cell 150 and the femtocell are transferred to the OSM/CPC server 100 located in the operator network through a connected wired network in step S508. When information regarding a position in which the FAP 106 is installed is accurately known, the OSM/CPC server 100 may calculate an interference level with the already installed FAP 106 based on the derived configuration information and measurement information, and then perform an optimization process in step S510 and transmit the result of performing the optimization to the FAP 106 in step S512.

Herein, when the optimization process is not performed, the FAP 106 is configured based on the derived operating frequency configuration information, and when the optimization process is performed, the FAP 106 receives a configuration confirm message and is then configured based on the operating frequency configuration information provided by the OSM/CPC server 100 through the configuration confirm message.

Then, the OSM/CPC server 100 performs an effective FAP region estimation process on the basis of the received FAP measurement information, and then stores the information received from the FAP 106 in step S514 and calculates a transmission power level (RX power level) in step S516.

Thereafter, the FAP 106 configures the operating frequency based on the operating frequency configuration information provided by the OSM/CPC server 100 in step S518, and inactivates the mobile terminal function by using the SDR technique in step S520. Next, the FAP 106 activates the femto AP function in step S522 to thus perform a base station function in step S524. These processes are performed even when an initial configuration and a self organization function of the FAP 106 are performed and configuration parameters are changed. Also, even when the power of the FAP 106 is turned off, the changed content is transferred to the OSM/CPC server 100 through a measurement/configuration report in step S526.

As such, when the power of the FAP 106 is turned off, the OSM/CPC server 100 deletes an entity in step S528.

Figure 6:
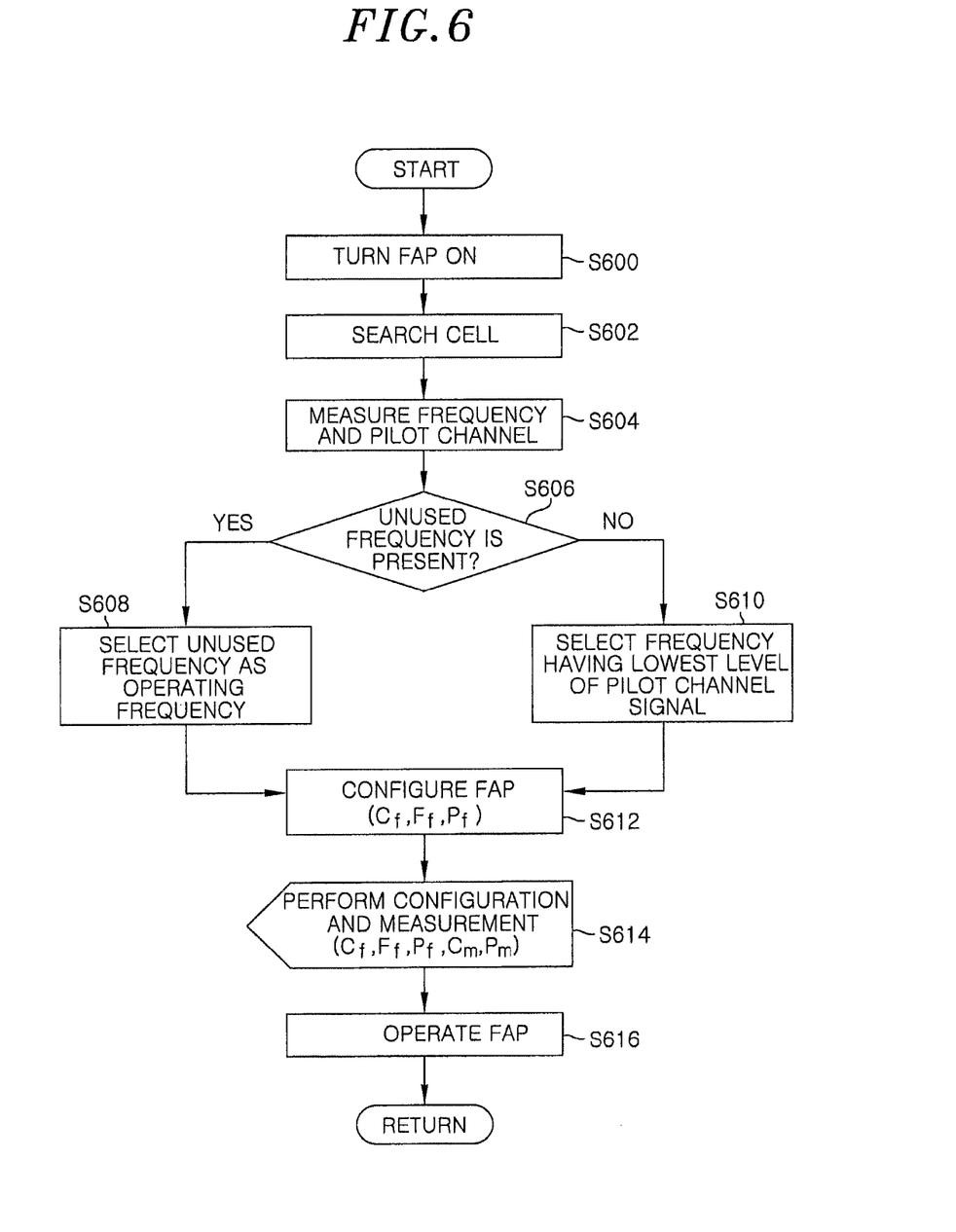
FIG. 6 illustrates an operating procedure of an FAP performing measurements and configuring operating parameters in accordance with the embodiment of the present invention.

FIG. 6 illustrates an operating procedure of the FAP 106 performing measurements and configuring operating parameters in accordance with the embodiment of the present invention.

With reference to FIG. 6, when the FAP 106 is turned on in step S600, it performs a cell search within a region in which the FAP itself is located to thus search the macro cell 150 and femtocells in step S602.

Thereafter, the FAP 106 measures an operating frequency and a pilot channel signal level through communication with the searched macro cell 150 and the femtocells in step S604, and checks whether or not there is any unused frequency in step S606.

Here, when there is any unused frequency, the FAP 106 selects the unused frequency in step S608, and when there is no unused frequency, the FAP 106 selects a frequency having a lowest pilot channel signal level in step S610.

Next, the FAP 106 performs the FAP configuration through communicate with the macro base station 120 of the macro cell 150 or the FAP (101 and 102) of the femtocell through the selected frequency to in step S612, and performs the configuration and measurement for operation of the FAP 106 in step S614 and then performs the operation of the FAP 106 in step S616. In FIG. 6, $C_f$, $F_f$, $P_f$ respectively present an FAP ID, a Frequency of FAP, a TX Power of FAP and $C_m$ and $P_m$ respectively present a Macro Cell ID and a Power of Pilot Channel on Macro cell.

Figure 7:
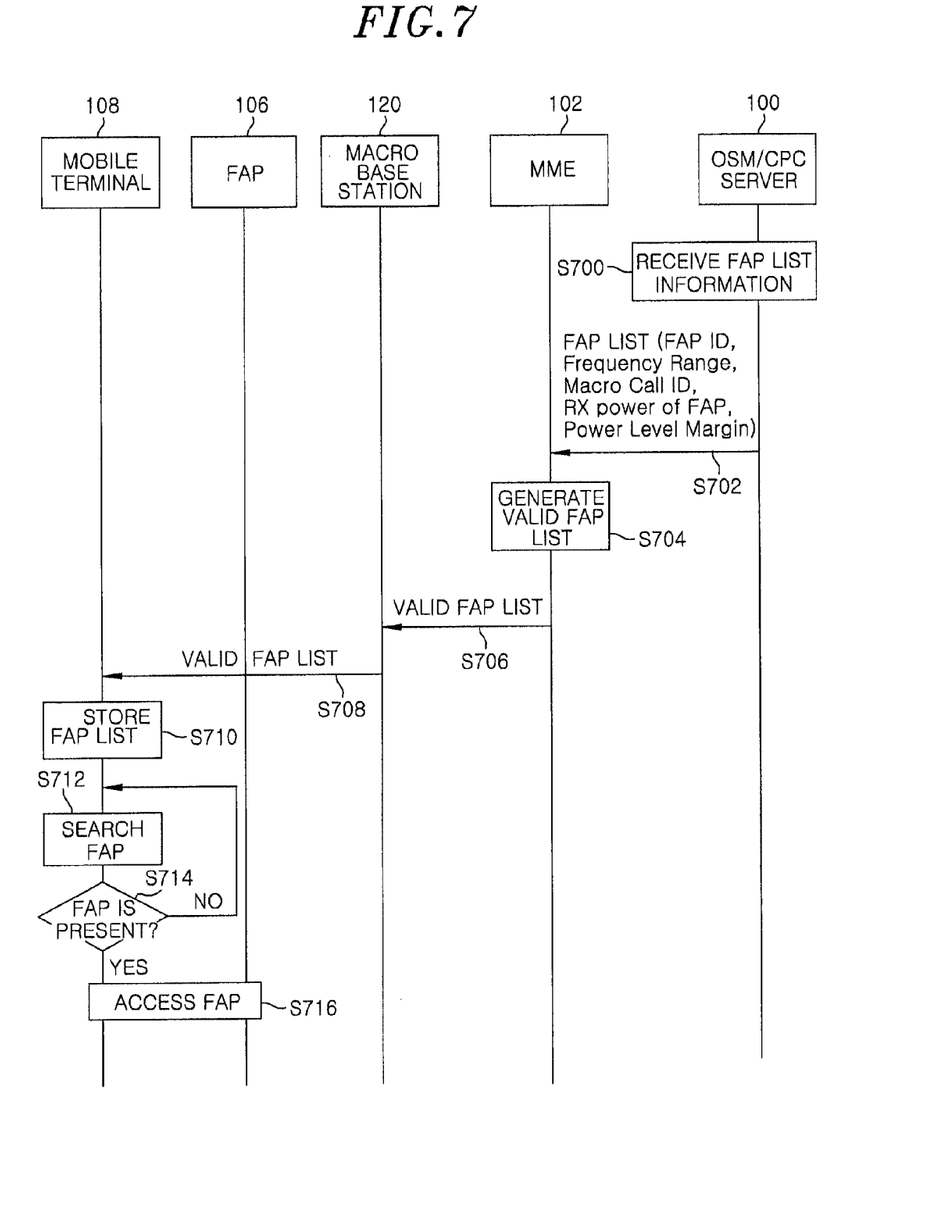
FIG. 7 is a flowchart illustrating a procedure of transferring FAP list information from an OSM/CPC server to a mobile terminal in accordance with the embodiment of the present invention.

FIG. 7 illustrates a procedure of transferring FAP list information from the OSM/CPC server 100 to the mobile terminal 108 in accordance with an embodiment of the present invention.

Referring to FIG. 7, the OSM/CPC server 100 in the core network receives FAP list information in step S700 and transfers a periodically generated FAP list to the MME 102 in step S702.

Then, the MME 102 checks the FAP capacity and whether a CSG FAP exists or not as described above and generates a valid FAP list by referring to the check result in step S704, and transfers the generated valid FAP list to the macro base station 120 of the macro cell 150 in step S706.

Thus, the macro base station 120 having received the valid FAP list transfers relevant information to the connected mobile terminal 108 through the system information in step S708.

Then, the mobile terminal 108 stores the received valid FAP list in step S710 and search an FAP by using the FAP search method as described above in step S712. Here, the mobile terminal 108 compares the pilot signal strength of the macro cell 150 with information such as the signal strength of the FAP within the FAP list or the like, to check whether or not there is an appropriate FAP in step S714. When there is the appropriate FAP, the mobile terminal 108 accesses the corresponding FAP in step S716.

Figure 8:
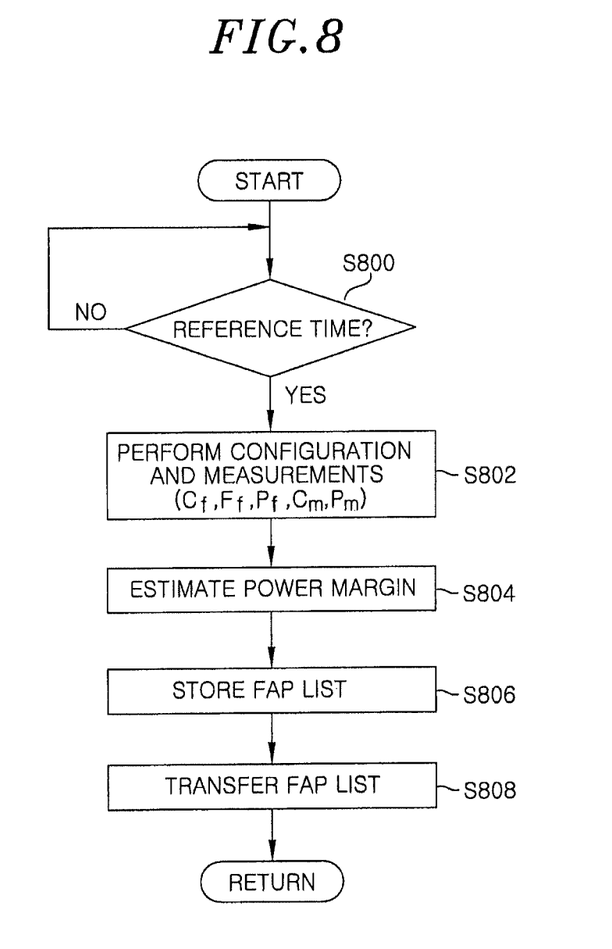
FIG. 8 illustrates an operational flowchart of an OSM/CPC server in accordance with the embodiment of the present invention.

FIG. 8 shows a process in which the OSM/CPC server 100 located in the core network receives and transfers FAP list information in accordance with the embodiment of the present invention.

With reference to FIG. 8, the OSM/CPC server 100 periodically checks whether or not a current time reaches a preset reference time by using a timer in step S800, and when the current time reaches the reference time, the OSM/CPC server 100 receives configuration and measurement information from each FAP in step S802.

Thereafter, the OSM/CPC server 100 calculates a power level margin by using the received configuration and measurement information in step S804 and stores the FAP list in step S806. And then, the OSM/CPC server 100 transfers information regarding the FAP list to the MME 102 in step S808.

Figure 9:
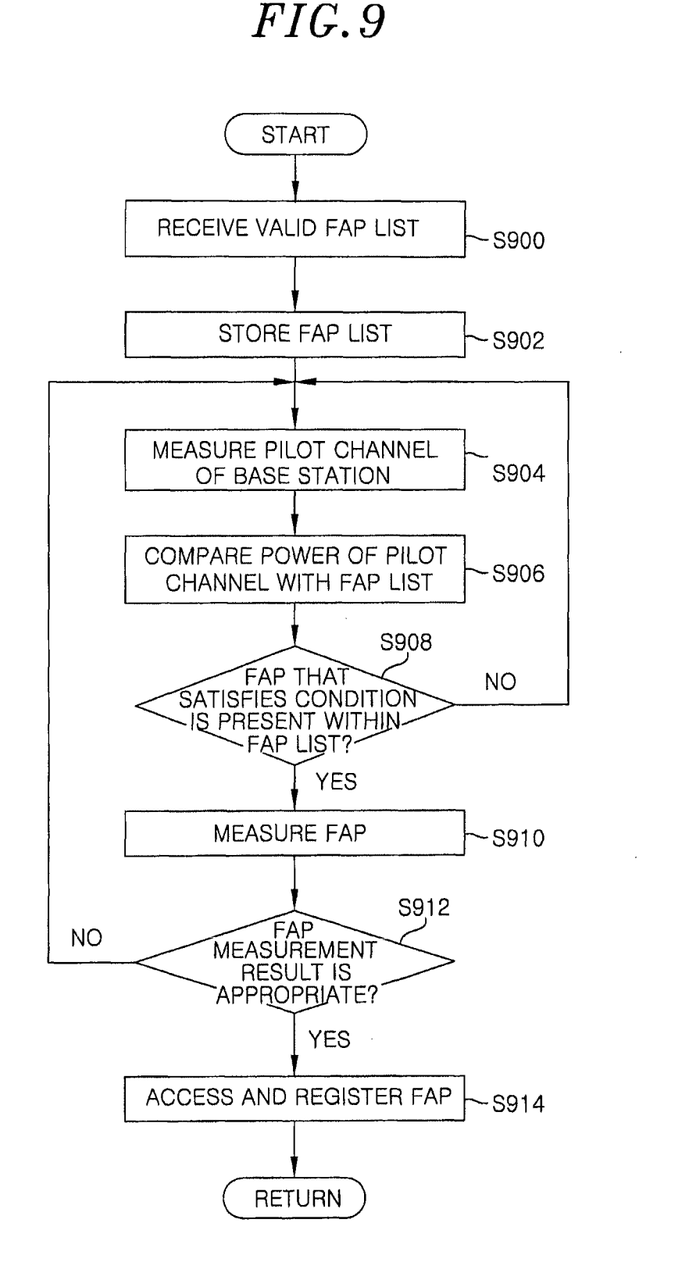
FIG. 9 is illustrates a process of receiving a valid FAP list at a mobile terminal and accessing an FAP from the mobile terminal in accordance with the embodiment of the present invention.

FIG. 9 illustrates a process of receiving a valid FAP list at the mobile terminal 108 and accessing an FAP from the mobile terminal in accordance with an embodiment of the present invention.

With reference to FIG. 9, first, the mobile terminal 108 receives a valid FAP list from the macro base station 120 in step S900 and stores the received FAP list in step S902.

Next, the mobile terminal 108 measures a pilot channel signal strength of the macro base station 120 in step S904.

Thereafter, the mobile terminal 108 compares the pilot channel signal strength of the macro base station 120 with a signal strength of each FAP within the FAP list in step S906, and checks whether or not there is an appropriate FAP that satisfies a predetermined condition among FAPs belonging to the FAP list resent based on the signal strength comparison result in step S908.

When there is any FAP having the signal strength satisfying the predetermined condition, the mobile terminal 108 collects configuration information and measurement information of the corresponding FAP in step S910, and checks whether or not it is in a status appropriate for accessing the mobile terminal 108 in step S912.

When it is determined that it is in the status appropriate for accessing the mobile terminal 108, the mobile terminal 108 accesses the corresponding FAP and registers completion of the access in step S914.

Figure 10:
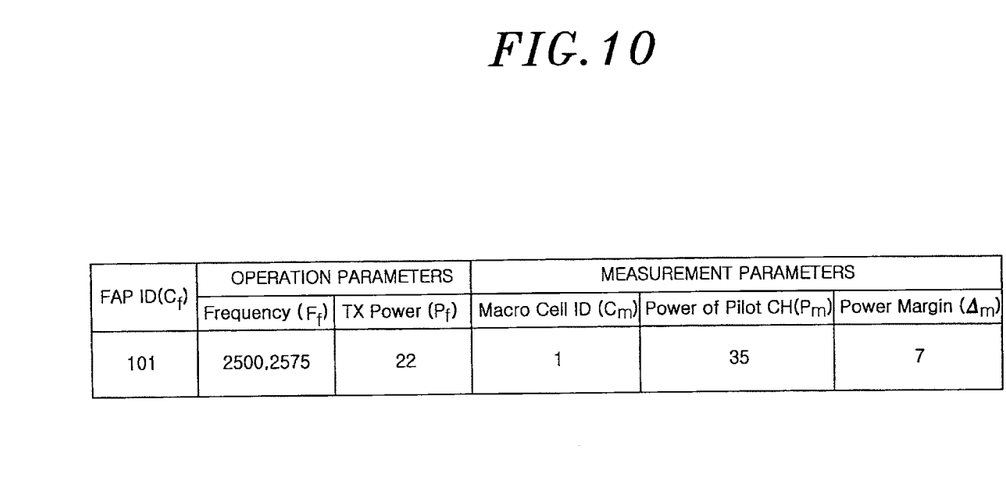
FIG. 10 is a view showing an FAP list data format in accordance with the embodiment of the present invention.

Herein, information included in the FAP list is an FAP ID ($C_f$), a Frequency ($F_f$), a TX Power ($P_f$), a Macro Cell ID ($C_m$), a Power of Pilot Channel ($P_m$), a Power margin ($A_m$) and the like as shown in FIG. 10.

As described above, in accordance with the present invention, the FAP searching method in which an FAP measures frequency configuration information of a neighbor macro cell and a femtocell by using an SDR-based mobile terminal function and then configures a frequency of the femtocell so that interference can be minimized is provided. In addition, an OSM/CPC server of a core network derives a reception signal margin by using a pilot channel reception signal of a macro cell received from the FAP and a transmission signal of the FAP and provides them to a mobile terminal, whereby a search load for the femtocell of the mobile terminal can be reduced. Also, filtering is performed on a collected FAP list, so that thereby reducing information regarding the FAP list transferred to the mobile terminal, thus decreasing the search load for the femtocell.

While the invention has been shown and described with respect to the particular embodiments, it will be understood by those skilled in the art that various changes and modification may be made without departing from the scope of the invention as defined in the following claims.

What is claimed is:

1. A method of searching a femtocell access point comprising:
   transmitting configuration/measurement information including an operating frequency and a transmission power strength determined by measuring a pilot channel signal strength of a base station within a macro cell, from multiple femtocell access points located within the macro cell to an operator spectrum manager (OSM)/cognitive pilot channel (CPC) server;
   receiving, at the OSM/CPC server, the configuration/measurement information from the femtocell access points, and generating a femtocell access point list usable in a mobile terminal to provide the generated femtocell access point list to the mobile terminal;
   obtaining, at the OSM/CPC server, a serviceable cell-radius of each femtocell access point which is obtained by using the configuration/measurement information transmitted from each femtocell access point; determining a transmission signal level range of the base station of the macro cell within the serviceable cell-radius; and generating the FAP list by using the configuration/measurement information and the transmission signal level range of the base station; and selecting, at the mobile terminal, one femtocell access point from the femtocell access point list provided from the OSM/CPC server and accessing the selected femtocell access point.

2. The method of claim 1, wherein said accessing the selected femtocell access point includes: comparing, at the mobile terminal, the configuration/measurement information of each femtocell access point included in the femtocell access point list with a pilot channel signal strength of the base station within the macro cell; and selecting a femtocell access point having a smallest frequency interference based on the comparison result and accessing the selected femtocell access point.

3. The method of claim 1, wherein said accessing the selected femtocell access point includes: continuously measuring a pilot channel signal strength of the base station within the macro cell by the mobile terminal; and selecting a femtocell access point within a pilot channel signal level range among the femtocell access points included in the femtocell access point list by using the configuration/measurement information of the femtocell access points, and accessing the selected femtocell access point.

4. The method of claim 1, wherein the femtocell access point selectively performs a mobile terminal function and a femtocell access point function by using a software defined radio (SDR) function.

5. The method of claim 1, wherein the femtocell access point list is periodically generated from the OSM/CPC server depending on a predetermined period and transmitted to the mobile terminal.

6. A system of searching a femtocell access point comprising:
   a femtocell access point for determining configuration/measurement information including an operating frequency and a transmission power strength by using a pilot channel signal strength measured from a base station within a macro cell;
   an operator spectrum manager (OSM)/cognitive pilot channel (CPC) server for receiving the configuration/measurement information from the femtocell access point, and generating a femtocell access point list; wherein the OSM/CPC server obtains a serviceable cell-radius of each femtocell access point which is obtained by using the configuration/measurement information transmitted from each femtocell access point; determines a transmission signal level range of the base station of the macro cell within the serviceable cell-radius; and generates the FAP list by using the configuration/measurement information and the transmission signal level range of the base station; and a mobile terminal for receiving the femtocell access point list from the OSM/CPC server and the configuration/measurement information on each femtocell access point included in the femtocell access point list with a pilot channel signal strength of the base station within the macro cell to access a femtocell access point having a smallest interference.

7. The system of claim 6, wherein the femtocell access point selectively performs a mobile terminal function and a femto access point function by using a software defined radio (SDR) function.

8. The system of claim 6, wherein the OSM/CPC server periodically generates the femtocell access point list depending on a predetermined period and provides the generated femtocell access point list to the mobile terminal.

9. The system of claim 6, wherein the mobile terminal continuously measures the pilot channel signal strength of the base station provided within the macro cell to search a femtocell access point within a pilot channel signal level range among the femtocell access points included in the femtocell access point list.

* * * * *